United States Patent [19]

Knap

[11] 4,148,515
[45] Apr. 10, 1979

[54] CANT RAIL AND SIDE COVER COMBINATION FOR PASSENGER VEHICLE

[75] Inventor: Joseph Knap, Montreal, Canada

[73] Assignee: Canadair Limited, Montreal, Canada

[21] Appl. No.: 890,315

[22] Filed: Mar. 27, 1978

[30] Foreign Application Priority Data

Jan. 13, 1978 [CA] Canada .................................. 294921

[51] Int. Cl.² ............................................ B62D 31/02
[52] U.S. Cl. .................................... 296/187; 105/401
[58] Field of Search ............. 296/28 R, 28 A, 137 R; 105/401, 409, 347, 396, 329; 52/45, 47, 51

[56] References Cited

U.S. PATENT DOCUMENTS 3,827,137  8/1974  Schubach ...................... 296/28 R X

*Primary Examiner*—Philip Goodman
*Attorney, Agent, or Firm*—A. Lebrun

[57] ABSTRACT

A skin construction positioned at the junction of a side wall with the roof of a passenger vehicle such as a railway passenger car, made of a simple extruded cant rail and a simple extruded side cover which are characterized by concealed attachment to the car body, readily removable attachment one to the other, and by a roof gutter in addition to an eaves drop gutter to be efficient against the worst weather conditions such as heavy and freezing rain and melting snow. The cant rail forms a roof gutter along the upper longitudinal edge thereof, the side cover forms an eaves drop gutter along the upper longitudinal edge thereof and is spaced from the side of the car to produce a longitudinal door closure and hanger space, the cant rail and side cover form a downward and an upward attachment flanges respectively which are removably secured flat against each other and by bolts laterally concealed inward of the eaves drop gutter.

12 Claims, 3 Drawing Figures

CANT RAIL AND SIDE COVER COMBINATION FOR PASSENGER VEHICLE

FIELD OF THE INVENTION

This invention relates to the skin construction at the junction between a side wall and the roof of a passenger vehicle, and more particularly, to a cant rail and side cover combination at such junction and particularly adapted for a railway passenger car for a rapid transit system.

DESCRIPTION OF THE PRIOR ART

In the prior art there have been provided such skin constructions which are each formed with an eaves drop gutter to catch and longitudinally channel the rain falling on the roof of the railway passenger car. It has been noted that such eaves drop gutter are often insufficient to prevent dripping of the rain or of water down along the side of the passenger car. Such undesirable situation arises for instance when heavy or freezing rain or melting snow clogs the eaves drop gutter.

Another relevant consideration relates to the provision of an overhead space to install the door closure and door hanger for doors exteriorly slidable along the side wall of the passenger car. So far, in the prior art such space has been provided by a separate elongated hood or cover laterally fixed to and projecting from the side wall of the car. There results an unaesthetic or outmoded appearance, an annoying protuberance, and the disadvantage of an otherwise unnecessary additional part.

SUMMARY OF THE INVENTION

It is a general object of the present invention to provide a cant rail and side cover combination which is adapted to alleviate the above mentioned disadvantages and more specifically to provide a gutter arrangement which is efficient even in the worst weather conditions such as of heavy or freezing rain or melting snow, and which is also aesthetically associated to the slidable doors and forms a space for the door closure and hanger operatively associated to these doors.

It is another object of the present invention to provide a cant rail and side cover combination which is of simple and extrudable skin construction.

It is a further object of the present invention to provide a cant rail and side cover combination which forms a roof gutter longitudinally extending along the upper edge thereof in addition to an eaves drop gutter.

It is still another object of the present invention to provide a cant rail and side cover combination wherein the cant rail and side cover are advantageously and more simply made in two separate parts with a pair of attachment flanges formed on these separate parts respectively and removably secured one against the other for readily removal of the side cover from the cant rail and to thereby give lateral access to the door closure and hanger system which is provided to actuate the doors.

It is a still further object of the present invention to provide a cant rail and side cover combination which forms a roof gutter in addition to an eaves drop gutter and which roof gutter is formed with a recessed bottom resting onto the roof framework and providing for concealed attachment of the cant rail to the body of the passenger vehicle.

BRIEF DESCRIPTION OF THE DRAWINGS

The above and other objects and advantages of the present invention will be better understood with reference to the following detailed description of a preferred embodiment thereof which is illustrated by way of example in the accompanying drawings; in which.

DESCRIPTION OF THE PREFERRED EMBODIMENT

Figure 1:
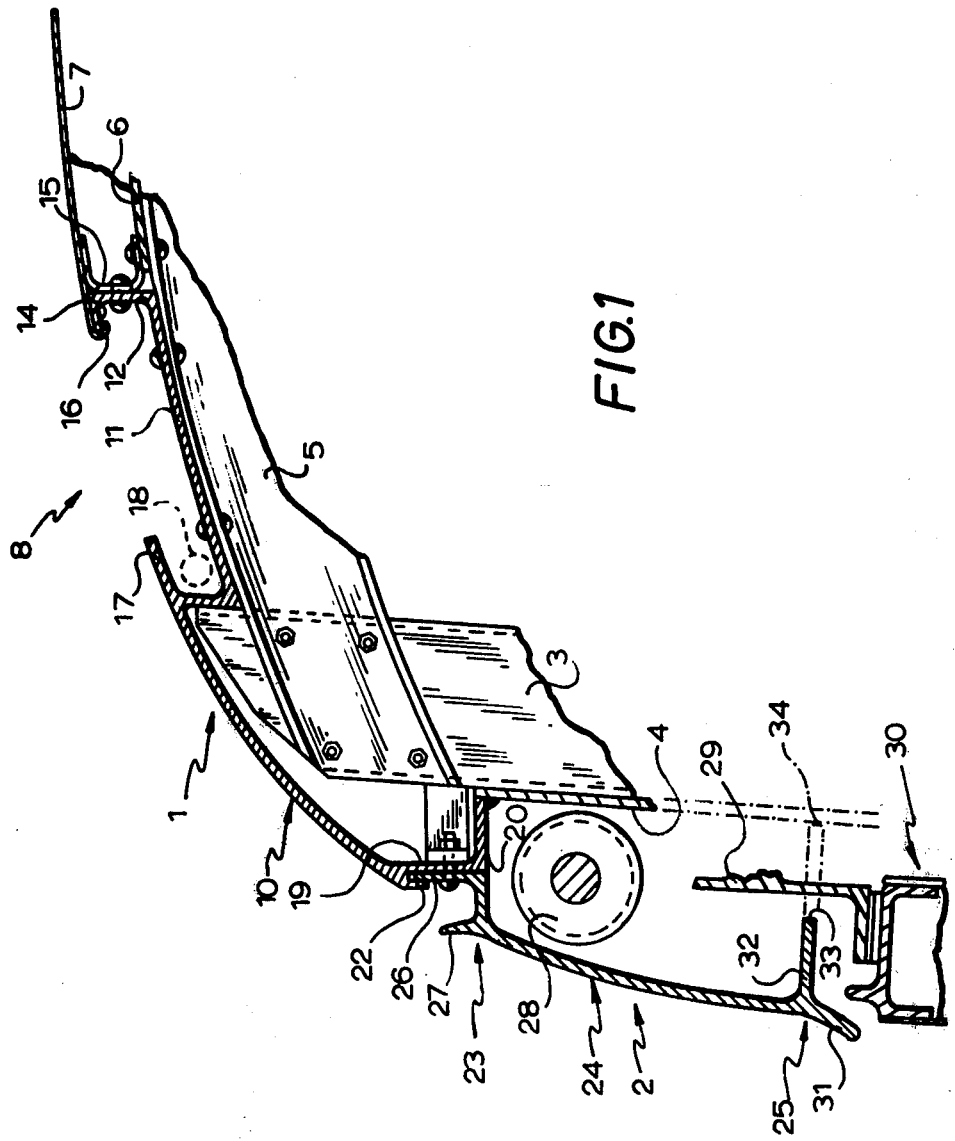
FIG. 1 is a cross sectional view taken transversely of a rapid transit passenger car and showing the junction between a side wall and the roof framework of the car in combination with a cant rail and side cover combination according to the present invention.
Figure 2:
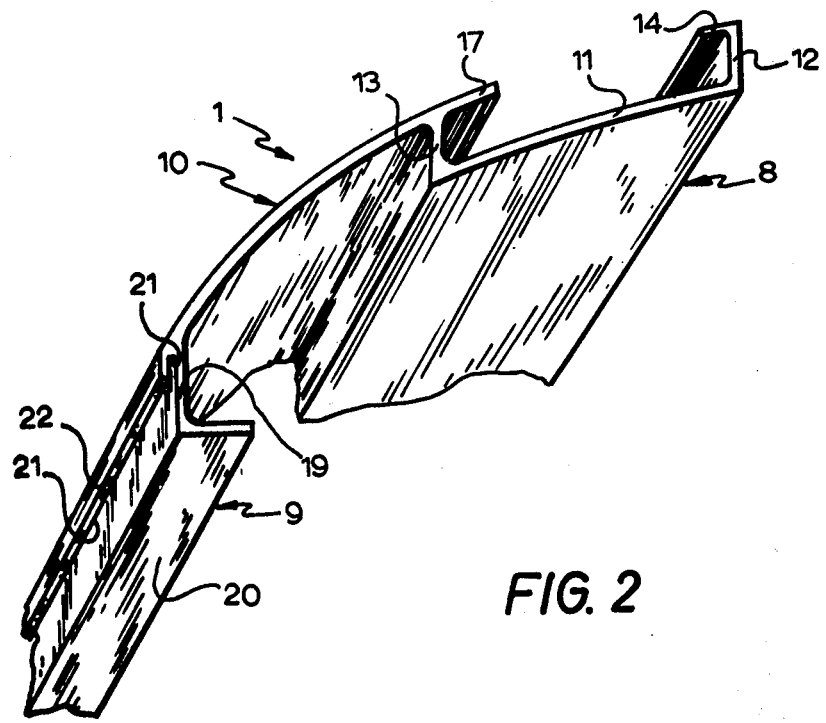
FIG. 2 is a perspective of one end of a cant rail according to the present invention and forming part of the combination in FIG. 1.
Figure 3:
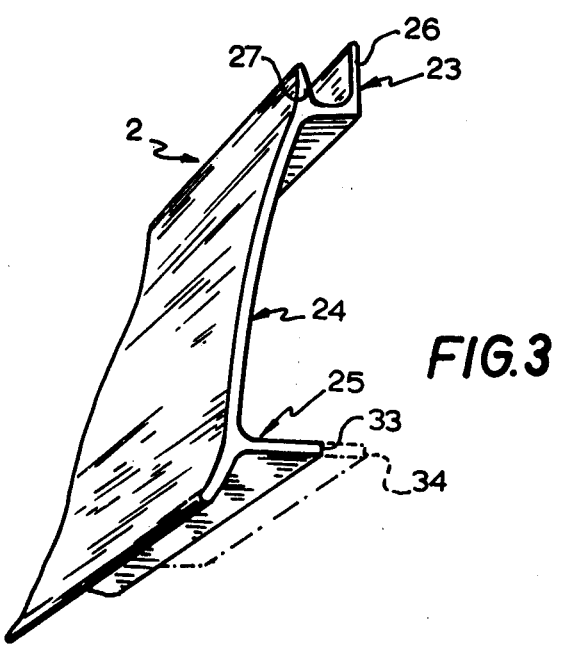
FIG. 3 is a perspective view of one end of a cant rail according to the present invention and combined with the cant rail to form the combination of FIG. 1.

The illustrated cant rail and side cover combination includes a cant rail 1 and a side cover 2 which are each substantially in the form of an extrudable skin member and preferably of aluminum. This cant rail and side cover combination is provided to be installed as the skin at the longitudinal junction between one side wall and the roof framework of a railway passenger car. It should be readily noted that the cant rail and side cover combination may as well be secured in similar manner to other passenger vehicles such as buses, metro cars, etc. In FIG. 1, the side wall of the car is represented by a post 3 and a skin 4 and the roof framework is represented by an arched cross member 5 which is rigidly secured to post 3 and forms a longitudinal junction with the side wall. The roof of the passenger car also includes an inner panel or sheet 6 secured onto the roof framework and a skin 7 extending longitudinally over the central portion of the car.

The cant rail 1 includes an upper longitudinal edge portion 8, a lower longitudinal edge portion 9, and an intermediate longitudinal portion 10 transversely extending intermediate these upper and lower portions. The upper longitudinal edge portion 8 is shaped to form a roof gutter whose bottom 11 is depressed relative to the adjoining edge portion of the intermediate portion 10 and extends lengthwise longitudinally of the car. The bottom 11 is transversely curved in conformity with the transverse curvature of the roof framework to rest evenly and firmly on the latter and be attached thereto. The opposite sides of the roof gutter are defined by transversely upright portions 12 and 13 of the upper edge portion 8. The upright side portion 12 terminates into a flange 14 transversely projecting edgewise in outward direction relative to the car. The upright side portion 12 is fixedly secured to the roof framework by a channel member 15 and rivets, bolts, or the like extending therethrough. The skin 7 has its corresponding lateral edge 16 bent around the free lateral edge of the flange 14. The bottom portion 11 of the roof gutter is transversely inclined outward to define a lower edge portion adjacent the upright side portion 13. The upper edge portion 8 of the cant rail also includes a lip portion 17 which overlies the aforementioned lower edge portion of the roof gutter and is arranged to transversely conceal the latter from view and also a heating cable 18 which may be laid longitudinally in this lower edge portion.

The lower longitudinal edge portion 9 of the cant rail 1 has an L or angular transverse cross section defined by an attachment flange 19 and an inner flange 20. The attachment flange 19 depends transversely edgewise from the lower longitudinal edge of the intermediate portion 10 of the cant rail. The inner flange 20 extends transversely edgewise inward from the lower edge of the attachment flange 19 and abuts edgewise against the corresponding side wall of the passenger car.

The intermediate portion 10 of the cant rail is transversely curved downwardly and outwardly from the lip portion 17 to the lower longitudinal edge thereof. The lower longitudinal edge portion of the intermediate portion 10 is formed with a groove 21 which laterally extends upward therein and outward of the attachment flange 19. This groove 21 is defined by a transversely depending flange 22 in cooperation with the attachment flange 19 from which it is outwardly spaced.

The side cover 2 includes an upper longitudinal edge portion 23, a lower longitudinal edge portion 24, and an intermediate longitudinal portion 25 which transversely extends between the upper and lower portions. The upper longitudinal edge portion 23 of the side cover forms an eaves drop gutter and includes an attachment flange 26 and an outer flange 27 which transversely extend edgewise upright and are laterally spaced apart to define this gutter. The eaves drop gutter underlies the lower edge of the intermediate portion of the cant rail for water dripping therein. The upper edge of the attachment flange 26 is engaged upwardly edgewise into the groove 21 and is releasably secured flat against the other attachment flange 19 by attachment bolts. The latter are thus laterally concealed from view in the eaves drop gutter by the outer flange 27 and allow removal of the side cover 2.

The intermediate portion 24 of the side cover 2 transversely depends edgewise from the outer flange 27 and is laterally spaced outward from the side wall of the car and thus provides a longitudinal space for a door closure and hanger system above a pair of slidable doors. The above system does not form part of the present invention and is schematically represented here by the outline of a pneumatic cylinder 28 and a door hanger bracket 29, upwardly projecting from a slidable door 30 of the car.

The lower longitudinal edge portion 25 of the side cover 2 includes a drip flange portion 31 transversely depending edgewise from the intermediate portion 24 and slightly inclined outward of the door 30 such that any dripping water will at least miss the top portion of the doors. The lower edge portion 25 of the side cover 2 also includes an inner flange portion 32 which transversely extends edgewise from the drip flange portion 31. The inner flange portion 32 defines an outer or free edge which has a longitudinal portion 33 overlying each pair of doors 30 which is operatively spaced from the side wall of the car. The outer or free edge of the inner flange portion 32 operatively abuts at 34 against the side wall longitudinally adjacent or between the pairs of slidable doors 30. The opening defined by each longitudinal edge portion 33 is of sufficient length to allow the full opening course of each slidable door 30.

What is claimed is:

1. A cant rail and side cover combination for a passenger car having a side wall and a roof framework, said combination comprising an elongated cant rail constructed and arranged to operatively extend lengthwise longitudinally of the passenger car at the junction of the roof framework with said side wall, an elongated side cover constructed and arranged to operatively extend lengthwise longitudinally of the passenger car under said elongated cant rail, said cant rail including an upper longitudinal edge portion forming a roof gutter running longitudinally thereof, said side cover including an upper longitudinal edge portion and an intermediate longitudinal portion, said upper longitudinal edge portion forming an eaves drop gutter underlying said cant rail, and said intermediate longitudinal portion transversely depending from said upper edge portion of the side cover, being operatively spaced outwardly from said side wall, and cooperatively forming a door closure and hanger space therewith.

2. A cant rail and side cover combination as defined in claim 1, wherein said cant rail includes a longitudinal lower edge portion having an attachment flange transversely depending edgewise and said upper longitudinal portion of the side cover includes an attachment flange transversely extending edgewise upward and removably securable flat against said attachment flange of the cant rail.

3. A cant rail and side cover combination as defined in claim 2, wherein said upper longitudinal edge portion of the side cover includes an outer longitudinal flange portion transversely extending upwardly, laterally spaced outwardly from said attachment flange of the side cover, and forming said eaves drop gutter cooperatively with said attachment flange off the side cover.

4. A cant rail and side cover combination as defined in claim 3, wherein said attachment flanges are releasably attached together by attachment devices inwardly concealed from view by said outer longitudinal flange portion.

5. A cant rail and side cover combination as defined in claim 3, wherein said upper longitudinal edge portion of the cant rail has an inwardly recessed longitudinal bottom portion operatively resting onto the roof framework and secured thereto, and constituting the bottom of said roof gutter.

6. A cant rail and side cover combination as defined in claim 5, wherein said upper longitudinal edge portion of the cant rail forms a longitudinal lip portion laterally protracting inward over said bottom portion of the roof gutter in laterally concealing relationship with the latter.

7. A cant rail and side cover combination as defined in claim 6, wherein said bottom portion is transversely inclined outwardly downward relative to the passenger car and defines a lower longitudinal edge portion underlying said lip portion and forming a concealed longitudinal recess for a heating cable.

8. A cant rail and side cover combination as defined in claim 7, wherein said cant rail includes a longitudinal portion transversely extending intermediate said upper edge portion and said lower edge portion thereof, transversely inclined progressively downward and outward from said lip portion, and forming a groove extending longitudinally and outward relative to said attachment flange of the cant rail and laterally upward into said intermediate portion of the cant rail.

9. A cant rail and side cover combination as defined in claim 8, wherein the lower edge portion of the cant rail has an angular shape transverse cross-section defined by said attachment flange thereof transversely depending edgewise from said intermediate portion of the cant rail, and a lower flange portion transversely extending inward edgewise from said attachment flange of the cant rail and having a free longitudinal edge operatively abutting against said side wall.

10. A cant rail and side cover combination as defined in claim 9, wherein said lower edge portion of the side cover includes a drip flange portion transversely depending from the intermediate portion of the side cover and an inner flange portion transversely extending edgewise relative to said drip flange portion and having a free edge having at least one longitudinal portion operatively spaced from said side wall and giving access to said door closure and hanger space.

11. A cant rail and side cover combination as defined in claim 10, wherein said inner flange portion includes longitudinal edge portions operatively abutting against said side wall longitudinally adjacent the doors of the passenger car.

12. In a rapid transit passenger car having a side wall, at least one pair of slidable doors operatively closing a passageway aperture through said side wall, an elongated cant rail extending lengthwise longitudinally of the rapid transit passenger car at the junction of the roof framework with said side wall, an elongated side cover extending lengthwise longitudinally of the passenger car and secured against said cant rail in underlying relationship therewith, said cant rail consisting of a metal skin and including an upper longitudinal edge portion, a lower longitudinal edge portion, and a transversely intermediate longitudinal portion, said upper longitudinal edge portion forming a roof gutter running longitudinally thereof, having a downwardly recessed longitudinal bottom portion fixed on the roof framework, and forming a longitudinal lip portion laterally protracting inward over said bottom portion, the latter constituting the bottom of said roof gutter, being transversely inclined outwardly downward relative to the railway passenger car, and defining a lower longitudinal edge portion underlying said lip portion and forming a concealed longitudinal recess for a heating cable laid therein, said transversely intermediate longitudinal portion transversely curving downward and outward from said lip portion and forming a groove extending longitudinally and transversely outward and upward relative to said lower longitudinal edge portion, said lower longitudinal edge portion having an L shape transverse cross-section formed by an attachment flange extending longitudinally of said intermediate portion and depending transversely edgewise from the latter, and an inner flange portion transversely extending inward edgewise from said attachment flange and having a free longitudinal edge abutting against said side wall, said side cover consisting of a metal skin and including an upper longitudinal edge portion, a lower longitudinal edge portion, and a transversely intermediate longitudinal portion, said upper edge portion of the side cover forming an eaves drop gutter operatively underlying the transversely intermediate portion of the cant rail and including an attachment flange and an outer flange extending longitudinally of the cant rail, transversely projecting upwardly edgewise, laterally spaced apart from each other transversely of the rapid transit passenger car, and forming the opposite sides respectively of said eaves drop gutter, the attachment flange of the side cover resting flat against the external side of the attachment flange of the cant rail and engaging upwardly edgewise into said groove, releasable attachment devices removably securing said attachment flanges together, said intermediate portion of the side cover transversely depending from said upper edge portion of the side cover, being outwardly spaced from said side wall and cooperatively forming with the latter a downwardly open elongated space overlying said doors and operatively housing a door closure and hanger assembly for said doors, said lower edge portion of the side cover including a drip flange portion transversely depending from the intermediate portion of the side cover and an inner flange portion transversely extending edgewise relative to said drip flange portion, including a free edge having one longitudinal portion overlying said doors, and operatively spaced from said side wall, and longitudinal edge portions operatively abutting against said side wall longitudinally adjacent the doors of the rapid transit passenger car.

* * * * *